(12) United States Patent
Ichikawa et al.

(10) Patent No.: US 11,335,502 B2
(45) Date of Patent: May 17, 2022

(54) FILM CAPACITOR, METHOD OF PRODUCING FILM CAPACITOR, DIELECTRIC RESIN FILM, AND METHOD OF PRODUCING DIELECTRIC RESIN FILM

(71) Applicant: Murata Manufacturing Co., Ltd., Nagaokakyo (JP)

(72) Inventors: Tomomichi Ichikawa, Nagaokakyo (JP); Shinichi Kobayashi, Nagaokakyo (JP); Tomoki Inakura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 227 days.

(21) Appl. No.: 16/524,414

(22) Filed: Jul. 29, 2019

(65) Prior Publication Data

US 2019/0348220 A1    Nov. 14, 2019

Related U.S. Application Data

(63) Continuation of application No. PCT/JP2018/001038, filed on Jan. 16, 2018.

(30) Foreign Application Priority Data

Feb. 3, 2017    (JP) .............................. JP2017-018568

(51) Int. Cl.
*H01G 4/18* (2006.01)
*H01G 4/32* (2006.01)
*H01G 4/008* (2006.01)
*H01G 4/14* (2006.01)

(52) U.S. Cl.
CPC ................. *H01G 4/18* (2013.01); *H01G 4/32* (2013.01); *H01G 4/008* (2013.01); *H01G 4/14* (2013.01)

(58) Field of Classification Search
CPC .................................. H01G 4/32; H01G 4/14
See application file for complete search history.

(56) References Cited

U.S. PATENT DOCUMENTS

| | | | |
|---|---|---|---|
| 5,540,974 | A | 7/1996 | Hoseki et al. |
| 6,630,234 | B1 | 10/2003 | Tanisho et al. |
| 8,451,579 | B2 | 5/2013 | Takeoka |
| 9,105,408 | B2 | 8/2015 | Ichikawa et al. |
| 9,873,771 | B2 | 1/2018 | Nomura et al. |

(Continued)

FOREIGN PATENT DOCUMENTS

| | | | | |
|---|---|---|---|---|
| CN | 1248514 A | * | 3/2000 | ............... C08L 67/02 |
| JP | H06172496 A | | 6/1994 | |

(Continued)

OTHER PUBLICATIONS

International Search Report issued in PCT/JP2018/001038, dated Apr. 17, 2018.

(Continued)

*Primary Examiner* — Eric W Thomas
(74) *Attorney, Agent, or Firm* — ArentFox Schiff LLP (57) ABSTRACT

A film capacitor that includes a dielectric resin film having a first surface and a second surface opposite to the first surface, the second surface having a silicone resin-containing layer; a first metal layer opposite to the first surface of the dielectric resin film; and a second metal layer opposed to the second surface of the dielectric resin film.

58 Claims, 3 Drawing Sheets

(56) References Cited

U.S. PATENT DOCUMENTS

| | | |
|---|---|---|
| 2010/0177456 A1 | 7/2010 | Miyamoto et al. |
| 2011/0090618 A1 | 4/2011 | Takeoka |
| 2014/0368970 A1 | 12/2014 | Ichikawa et al. |
| 2017/0073481 A1 | 3/2017 | Nomura et al. |

FOREIGN PATENT DOCUMENTS

| | | |
|---|---|---|
| JP | H06181142 A | 6/1994 |
| JP | H10128908 A | 5/1998 |
| JP | H10294236 A | 11/1998 |
| JP | 2009054669 A | 3/2009 |
| JP | 5370363 B2 | 12/2013 |
| JP | 2015181199 A | 10/2015 |
| WO | 9858987 A1 | 12/1998 |
| WO | 2007080757 A1 | 7/2007 |
| WO | 2007129695 A1 | 11/2007 |
| WO | 2010004700 A | 1/2010 |
| WO | 2013069485 A1 | 5/2013 |
| WO | 2013128726 A1 | 9/2013 |
| WO | 2015186744 A1 | 12/2015 |

OTHER PUBLICATIONS

Written Opinion of the International Searching Authority issued in PCT/JP2018/001038, dated Apr. 17, 2018.

* cited by examiner

FILM CAPACITOR, METHOD OF PRODUCING FILM CAPACITOR, DIELECTRIC RESIN FILM, AND METHOD OF PRODUCING DIELECTRIC RESIN FILM

CROSS REFERENCE TO RELATED APPLICATIONS

The present application is a continuation of International application No. PCT/JP2018/001038, filed Jan. 16, 2018, which claims priority to Japanese Patent Application No. 2017-018568, filed Feb. 3, 2017, the entire contents of each of which are incorporated herein by reference.

FIELD OF THE INVENTION

The present invention relates to a film capacitor, a method of producing a film capacitor, a dielectric resin film, and a method of producing a dielectric resin film.

BACKGROUND OF THE INVENTION

One type of capacitor is a film capacitor having a structure in which a first electrode and a second electrode are disposed so as to be opposed to each other with a flexible resin film as a dielectric interposed therebetween. The film capacitor is produced, for example, by winding a resin film having the first electrode and a resin film having the second electrode to each other. In this case, the wound body of the resin films is pressed into a flat shape in order to make the size of the film capacitor compact.

As a technique relating to a film capacitor, Patent Document 1 discloses that a large number of minute protrusions made of two types of spherical silica fine particles are provided on a surface of a film made of polyethylene-2,6-naphthalate as a thermoplastic resin. According to the method described in Patent Document 1, the low friction of the film can be ensured.

Further, Patent Document 2 discloses that an underlayer made of a silicon-based material is provided on one surface of a base film containing mainly a thermoplastic resin such as polyethylene naphthalate (PEN), polyphenylene sulfite (PPS) or polyethylene terephthalate (PET) in order to adjust the surface energy of the surface to a range of 25 mN/m to 40 mN/m, and then a metal thin film electrode is provided on the surface. According to the method described in Patent Document 2, since adhesion between the surface of the film and the electrode is reduced, a self-healing (SH) effect for recovering insulation can be obtained.

Patent Document 1: Japanese Patent Application Laid-Open No. 10-294236
Patent Document 2: Japanese Patent No. 5370363

SUMMARY OF THE INVENTION

A thermosetting resin is used as a material of the resin film for the film capacitor in addition to the thermoplastic resins described in Patent Documents 1 and 2. The thermosetting resin has characteristics such as high heat resistance and high voltage resistance.

As described above, a wound body of the resin film may be pressed in order to compact the size of the film capacitor, but press performance may not be good depending on the resin film. As a result, there has been a problem that the wound body is not pressed into a desired size or is pressed into an irregular shape. The press performance of the film capacitor is considered to be dependent on the low friction between resin films at the time of pressing, and it is specifically considered that when a surface of a resin film and an electrode (metal layer) opposed to the surface of the resin film are able to slide on each other, the press performance is good.

However, regarding a film capacitor including a resin film using a curable resin such as a thermosetting resin, there has been no known procedure which improves the low friction to a level effective for the press performance.

The present invention has been made in order to solve the above problems, and an object of the present invention is to provide a film capacitor having excellent degree of low friction between a surface of a resin film and a metal layer opposed to the surface of the resin film. Further, another object of the present invention is to provide a method of producing the film capacitor, a dielectric resin film included in the film capacitor, and a method of producing the dielectric resin film.

A film capacitor of the present invention includes a dielectric resin film having a first surface and a second surface opposite to the first surface, the second surface having a silicone resin-containing layer, a first metal layer opposed to the first surface of the dielectric resin film, and a second metal layer opposed to the second surface of the dielectric resin film.

In a first aspect of the film capacitor of the present invention, the silicone resin-containing layer contains a reaction product of a silicone resin and a curable resin contained in the dielectric resin film.

In a second aspect of the film capacitor of the present invention, a surface energy of the second surface of the dielectric resin film is 45 mN/m or less.

In a third aspect of the film capacitor of the present invention, a contact angle of water with respect to the second surface of the dielectric resin film is 87° or more.

A method of producing a film capacitor of the present invention includes: producing a dielectric resin film having a first surface and a second surface opposite to the first surface by using a resin solution containing a curable resin or a precursor of the curable resin and a silicone resin; forming a first metal layer on the first surface of the dielectric resin film; and opposing a second metal layer to the second surface of the dielectric resin film.

A dielectric resin film of the present invention has a first surface and a second surface opposite to the first surface, and the second surface has a silicone resin-containing layer.

In a first aspect of the dielectric resin film of the present invention, the silicone resin-containing layer contains a reaction product of a silicone resin and a curable resin contained in the dielectric resin film.

In a second aspect of the dielectric resin film of the present invention, a surface energy of the second surface is 45 mN/m or less.

In a third aspect of the dielectric resin film of the present invention, a contact angle of water with respect to the second surface is 87° or more.

A method of producing a dielectric resin film having a first surface and a second surface opposite to the first surface includes: preparing a resin solution containing a curable resin or a precursor of the curable resin and a silicone resin; forming the resin solution into a film; and curing the film.

According to the present invention, it is possible to provide a film capacitor excellent in terms of low friction between a surface of a resin film and a metal layer opposed to the surface of the resin film.

DETAILED DESCRIPTION OF THE INVENTION

Hereinafter, a film capacitor of the present invention, a method of producing the film capacitor, a dielectric resin film included in the film capacitor, and a method of producing the dielectric resin film will be described.

However, the present invention is not limited to the following configuration and may be appropriately modified and applied without departing from the spirit of the present invention. The present invention also encompasses combinations of two or more of the individual desirable configurations of the present invention described below.

Hereinafter, an example of a wound-type film capacitor obtained by winding a dielectric resin film having a first metal layer and another dielectric resin film having a second metal layer to each other will be described as an embodiment of the present invention.

In the present invention, since a silicone resin is contained in at least the second surface of the dielectric resin film of the film capacitor, the press performance when the dielectric resin film is processed into the capacitor becomes good. This is believed to be because the surface energy (surface free energy) of the resin film is reduced by the silicone resin. Surface energy is energy that interacts with a surface of a film due to intermolecular forces, polar forces, hydrogen bonding, or the like. It is understood that when the silicone resin is contained in at least the second surface of the dielectric resin film, the energy for drawing the other side on the film surface is lowered, thereby improving the low friction between the second surface of the resin film and the metal layer opposed to the surface of the resin film.

The present invention can be applied to a laminated film capacitor obtained by layering a dielectric resin film having a first metal layer and another dielectric resin film having a second metal layer with each other.

In producing a film capacitor, a dielectric resin film is formed on a base film made of a thermoplastic resin such as polypropylene (PP), polyethylene terephthalate (PET), or polystyrene (PS). Thereafter, in the process of vapor-depositing a metal layer on the dielectric resin film that is on the base film, the dielectric resin film is wound into a roll shape so that the surface of the dielectric resin film in which the metal layer is not vapor-deposited is in contact with the back surface of the base film. In this case, when the silicone resin is not contained in the dielectric resin film, the low friction between the surface of the dielectric resin film and the back surface of the base film is poor, whereby wrinkles are likely to occur during the winding operation. As a result, traces remain on the wound film, thus causing problems such as deterioration in electrical characteristics. Meanwhile, when the silicone resin is contained in the dielectric resin film, the above problem can be prevented. As described above, the technique of the present invention is also effective in the step of producing the film, so that the technique is applicable to not only a wound-type film capacitor requiring press performance but also other film capacitors such as a laminated film capacitor.

[Film Capacitor]

The film capacitor of the present invention includes a dielectric resin film having a first surface and a second surface opposite to the first surface and containing a curable resin, a first metal layer formed on the first surface of the dielectric resin film, and a second metal layer opposed to the second surface of the dielectric resin film. It is preferable that the second metal layer is not formed on the dielectric resin film having the first metal layer, but is formed on another dielectric resin film. Further, it is preferable that the second metal layer is opposed to the second surface of the dielectric resin film so as to be partially in contact with the second surface of the dielectric resin film. The other dielectric resin film may have a configuration which is different from that of the dielectric resin film having the first metal layer and preferably has the same configuration as that of the dielectric resin film having the first metal layer.

Usually, the film capacitor of the present invention further includes a first external terminal electrode and a second external terminal electrode which are electrically connected to the first metal layer and the second metal layer, respectively.

Figure 1:
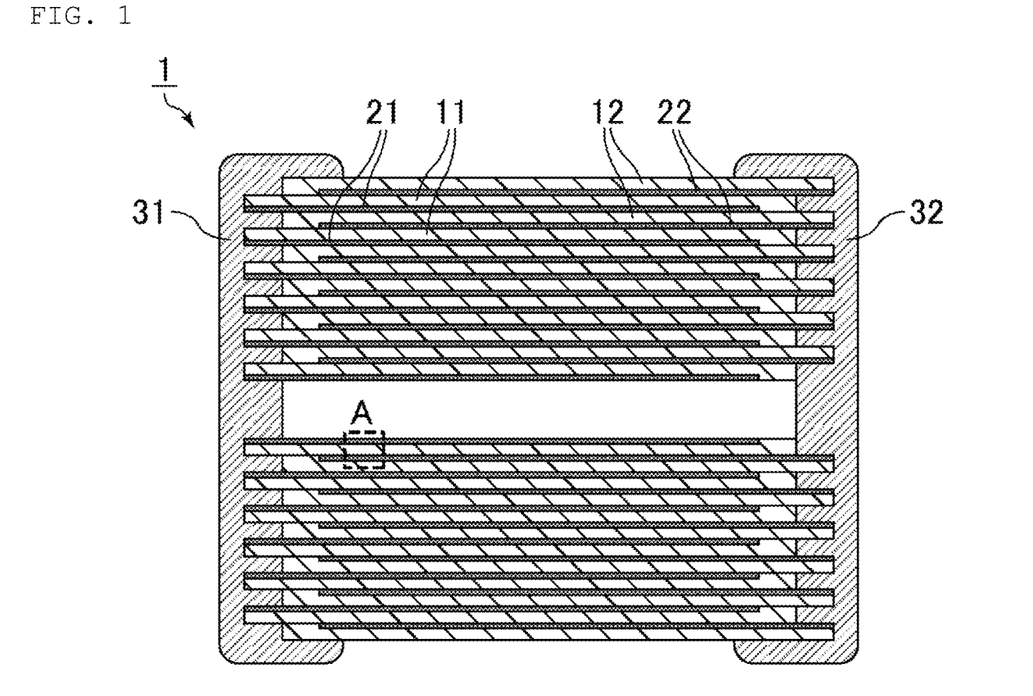
FIG. 1 is a sectional view schematically illustrating an example of a film capacitor of the present invention.

FIG. 1 is a sectional view schematically illustrating an example of a film capacitor of the present invention. The film capacitor 1 illustrated in FIG. 1 is a wound-type film capacitor, and the film capacitor 1 includes a first dielectric resin film 11 and a second dielectric resin film 12 which are in a wound state, a first metal layer (first electrode) 21 and a second metal layer (second electrode) 22 which are opposed to each other with the first dielectric resin film 11 or the second dielectric resin film 12 interposed therebetween, a first external terminal electrode 31 electrically connected to the first metal layer 21, and a second external terminal electrode 32 electrically connected to the second metal layer 22.

The first metal layer 21 is formed on the first dielectric resin film 11, and the second metal layer 22 is formed on the second dielectric resin film 12. The film capacitor 1 is configured such that the first dielectric resin film 11 having the first metal layer 21 and the second dielectric resin film 12 having the second metal layer 22 are wound in a layered state.

The first metal layer 21 is formed on one surface of the first dielectric resin film 11 such that the first metal layer 21 reaches one side edge of the first dielectric resin film 11, but does not reach the other side edge thereof. Meanwhile, the second metal layer 22 is formed on one side of the second dielectric resin film 12 such that the second metal layer 22 does not reach one side edge of the second dielectric resin film 12, but reaches the other side edge thereof. Each of the first metal layer 21 and the second metal layer 22 is made of, for example, an aluminum layer. In the film capacitor of the present invention, it is preferable that the second metal layer is an aluminum layer, and it is more preferable that both the first metal layer and the second metal layer are aluminum layers.

As illustrated in FIG. 1, the first dielectric resin film 11 and the second dielectric resin film 12 are layered so as to be offset from each other in the width direction (the right-left direction in FIG. 1) so that an end portion of the first metal layer 21 which reaches the side edge of the first dielectric resin film 11 and an end portion of the second metal layer 22 which reaches the side edge of the second dielectric resin film 12 are exposed from the layered films. The first dielectric resin film 11 and the second dielectric resin film 12 are wound in a layered state, whereby the first metal layer 21 and the second metal layer 22 are layered in a state of being exposed at the end portions.

In the film capacitor 1 illustrated in FIG. 1, the second dielectric resin film 12 is located outside the adjacent first dielectric resin film 11, and the first dielectric resin film 11 and the second dielectric resin film 12 are wound so that both the first metal layer 21 and the second metal layer 22 face inward.

The first external terminal electrode 31 and the second external terminal electrode 32 are formed by spraying zinc or the like onto each end surface of the body of the capacitor obtained as described above. The first external terminal electrode 31 is in contact with the exposed end portion of the first metal layer 21 and is thus electrically connected to the first metal layer 21. Meanwhile, the second external terminal electrode 32 is in contact with the exposed end portion of the second metal layer 22 and is thus electrically connected to the second metal layer 22.

In the film capacitor of the present invention, it is preferable that the wound body of the dielectric resin film is pressed into a flat shape to have the cross section in an elliptical shape or an oval shape, thereby making the wound body more compact. The film capacitor of the present invention may have a cylindrical winding shaft. The winding shaft is disposed on the central axis of the dielectric resin film in the wound state and serves as a winding shaft for winding the dielectric resin film.

Figure 2:
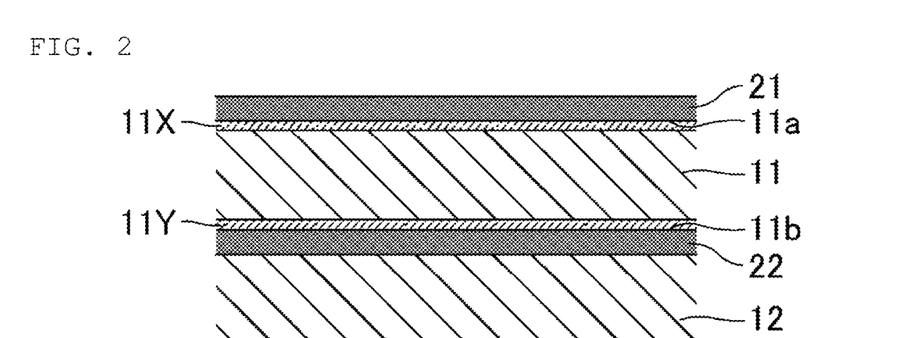
FIG. 2 is an enlarged sectional view of a portion A of the film capacitor illustrated in FIG. 1.

FIG. 2 is an enlarged sectional view of a portion A of the film capacitor illustrated in FIG. 1. As illustrated in FIG. 2, the first metal layer 21 is formed on a first surface 11a which is one surface of the first dielectric resin film 11. Meanwhile, the second metal layer 22 is opposed to a second surface 11b which is the other surface of the first dielectric resin film 11. In FIG. 2, the second metal layer 22 is opposed to the second surface 11b of the first dielectric resin film 11 so as to be in contact with the second surface 11b of the first dielectric resin film 11. As described above, the second metal layer 22 is not formed on the first dielectric resin film 11 having the first metal layer 21 but is formed on the second dielectric resin film 12.

Further, in FIG. 2, a silicone resin-containing layer 11Y is provided at the side of the second surface 11b of the first dielectric resin film 11, and a silicone resin-containing layer 11X is also provided at the side of the first surface 11a.

In FIG. 2, for ease of explanation, boundary lines between the silicone resin-containing layer 11X and the first dielectric resin film 11 and between the silicone resin-containing layer 11Y and the first dielectric resin film 11 are clearly illustrated, but the boundary lines do not necessarily appear clearly. Although the silicone resin-containing layer is not illustrated in the second dielectric resin film 12, it is preferable that the silicone resin-containing layer is provided in the same manner as the first dielectric resin film 11.

In the film capacitor of the present invention, the dielectric resin film contains, as a main component, at least one curable resin such as a thermosetting resin or a photocurable resin. The dielectric resin film usable in the film capacitor of the present invention is also a separate invention disclosed herein.

The term "thermosetting resin" used herein indicates a resin that can be cured by, for example, heat, but is not limited thereto. Therefore, a resin cured by a method other than heat (e.g., light, electron beam) may also be included as an example of the thermosetting resin. Depending on the material, the reaction may start in response to the reactivity of the material itself, and resins which are cured without externally applying heat, light, or the like may also be used as the thermosetting resins. The same holds true for the photocurable resin and does not limit the curing method.

The term "main component" used herein indicates a component having the largest abundance ratio (wt %), and preferably indicates a component having an abundance ratio of more than 50 wt %. Therefore, the dielectric resin film may contain, as a component other than the main component, an additive such as a silicone resin to be described below or an uncured portion of starting materials such as a first organic material and a second organic material.

The curable resin contained in the dielectric resin film is not particularly limited and is preferably a thermosetting resin made of a cured product of a first organic material and a second organic material. Examples of the thermosetting resin include a cured product obtained by reacting a hydroxyl group (OH group) included in the first organic material with an isocyanate group (NCO group) included in the second organic material. Specifically, it is preferable that the first organic material is a phenoxy resin and the second organic material is an isocyanate compound.

The first organic material is preferably a polyol having a plurality of hydroxyl groups (OH groups) in the molecule. Examples of the polyol include polyether polyol, polyester polyol, and polyvinyl acetoacetal. As the first organic material, two or more kinds of organic materials may be used in combination. Among the first organic materials, a polyether polyol phenoxy resin is preferable.

Phenoxy resins have a plurality of hydroxyl groups. As the phenoxy resin, a high-molecular-weight bisphenol A-type epoxy resin having an epoxy group at a terminal is preferable. As the first organic material, two or more kinds of phenoxy resins may be used in combination.

The second organic material is preferably an isocyanate compound, an epoxy resin, or a melamine resin, which has a plurality of functional groups in a molecule. As the second organic material, two or more kinds of organic materials may be used in combination.

The isocyanate compound has a plurality of isocyanate groups. The isocyanate compound functions as a curing agent for curing the film by reacting with a hydroxyl group of the first organic material such as a phenoxy resin to form a cross-linked structure.

Examples of the isocyanate compound include aromatic polyisocyanates such as diphenylmethane diisocyanate (MDI) and tolylene diisocyanate (TDI) and aliphatic polyisocyanates such as hexamethylene diisocyanate (HDI). Modified products of these polyisocyanates, for example, modified products containing carbodiimide or urethane and the like may be used. Among them, aromatic polyisocyanates are preferable, and MDI is more preferable. As the second organic material, two or more kinds of isocyanate compounds may be used in combination.

The epoxy resin is not particularly limited as long as it is a resin having an epoxy ring, and examples of the epoxy resin include bisphenol A-type epoxy resins, biphenyl backbone epoxy resins, cyclopentadiene backbone epoxy resins, and naphthalene backbone epoxy resins.

The melamine resin is not particularly limited as long as it is an organic nitrogen compound having a triazine ring at the center of the structure and three amino groups around the triazine ring, and examples of the melamine resin include alkylated melamine resins. In addition, modified products of melamine may be used.

In a case where the curable resin contained in the dielectric resin film is the above-mentioned thermosetting resin, it is not necessary that all the hydroxyl groups of the first organic material and the isocyanate groups of the second organic material react, and some of the hydroxyl groups and some of the isocyanate groups may remain in the film. That is, the dielectric resin film may contain at least one of a hydroxyl group and an isocyanate group. In this case, it is preferable that the content of the hydroxyl group in the dielectric resin film is larger than the content of the isocyanate group in the dielectric resin film.

(First Aspect)

In the first aspect of the film capacitor of the present invention, a silicone resin is contained in at least the second surface of the dielectric resin film.

Examples of the silicone resin include polyester-modified polydimethylsiloxane and polyether-modified polydimethylsiloxane and the like. These silicone resins do not necessarily have functional groups such as a hydroxyl group (OH group), an isocyanate group (NCO group), an epoxy group, a carboxy group (COOH group), or an amino group (NH2 group), and it is preferable that the silicone resins have functional groups. Two or more kinds of silicone resins may be used in combination.

In the first aspect, it is preferable that a reaction product of a silicone resin and a curable resin is contained in the second surface of the dielectric resin film. As described above, when the silicone resin has functional groups such as a hydroxyl group, the hydroxyl group reacts with the isocyanate group or the like of the curable resin to form a cross-linked structure, thereby improving the low friction between the resin film and the metal layer.

The reaction of the silicone resin with the curable resin can be confirmed by the fact that the silicone resin is not eluted from the film when the dielectric resin film is immersed in a solvent in which the silicone resin is soluble. Elution of the silicone resin can be confirmed by Fourier transform infrared spectroscopy (FT-IR) analysis.

In the first aspect, it is preferable that the amount of the silicone resin contained in the dielectric resin film decreases from the second surface toward the inside of the film in the thickness direction of the dielectric resin film. The amount of the silicone resin decreases toward the inside of the film, whereby deterioration of the characteristics of the curable resin can be suppressed.

In this description, when surface analysis performed by X-ray photoelectron spectroscopy (XPS) in the depth direction of the dielectric resin film reveals that the amount of Si element present in the outermost surface (depth: 0 nm) of the film is larger than the amount of Si element present at a depth of 5 nm, it may be considered that the amount of silicone resin decreases from the second surface (or the first surface) toward the inside of the film.

In the first aspect, the silicone resin may be contained in at least the second surface of the dielectric resin film and also preferably contained in the first surface. In this case, it is preferable that the reaction product of the silicone resin and the curable resin is contained in the first surface of the dielectric resin film.

In a case where the silicone resin is contained in the first surface of the dielectric resin film, it is preferable that the amount of the silicone resin contained in the dielectric resin film decreases from the first surface toward the inside of the film in the thickness direction of the dielectric resin film.

In the first aspect, the amount of the silicone resin contained in the dielectric resin film is preferably 0.3 wt % or more and more preferably 0.5 wt % or more with respect to the amount of the curable resin. When the amount of the silicone resin is 0.3 wt % or more, the press performance of the wound body becomes good.

The amount of the silicone resin contained in the dielectric resin film indicates an amount of the silicone resin contained in the whole film.

In the first aspect, the amount of the silicone resin contained in the dielectric resin film is preferably 15 wt % or less and more preferably 10 wt % or less with respect to the amount of the curable resin. In this case, it is preferable that the silicone resin is also contained in the first surface of the dielectric resin film. When the amount of the silicone resin is 15 wt % or less, the adhesion between the first surface of the dielectric resin film and the first metal layer is excellent, and the first metal layer is unlikely to be peeled from the film.

In the first aspect, the surface energy of the second surface of the dielectric resin film is preferably 45 mN/m or less and more preferably 30 mN/m or less. When the surface energy of the second surface is 45 mN/m or less, the press performance of the wound body becomes good. Meanwhile, the surface energy of the second surface of the dielectric resin film is preferably 24 mN/m or more.

In the first aspect, the surface energy of the second metal layer is preferably 50 mN/m or more and more preferably 55 mN/m or more. When the surface energy of the second metal layer is 50 mN/m or more, the press performance of the wound body becomes good. Meanwhile, the surface energy of the second metal layer is preferably 80 mN/m or less.

In the first aspect, the surface energy of the first surface of the dielectric resin film is preferably 22 mN/m or more. In this case, it is preferable that the silicone resin is also contained in the first surface of the dielectric resin film. When the surface energy of the first surface is 22 mN/m or more, the adhesion between the first surface of the dielectric resin film and the first metal layer is excellent, and the first metal layer is unlikely to be peeled from the film. Meanwhile, the surface energy of the first surface of the dielectric resin film is preferably 30 mN/m or less.

The surface energy (surface free energy) of the first surface of the dielectric resin film indicates the surface energy of the first surface in the absence of the first metal layer or the surface energy of the first surface before the formation of the first metal layer.

The surface energy (surface free energy) of the second surface of the dielectric resin film can be obtained by measuring the contact angle by using three liquids—water, ethylene glycol, and diiodomethane as reagents whose surface energy is known, and performing calculations based on the Kitazaki-Hata theory. The surface energy of the second metal layer and the surface energy of the first surface can also be calculated in the same manner as the surface energy of the second surface. The contact angle of water is measured by a method to be described later, and the contact angle of each of the other two liquids is measured by a similar method.

In the first aspect, the contact angle of water with respect to the second surface of the dielectric resin film (hereinafter also referred to as the contact angle of the second surface) is preferably 87° or more and more preferably 97° or more. When the contact angle of water with respect to the second surface is 87° or more, the press performance of the wound body becomes good. Meanwhile, the contact angle of water with respect to the second surface of the dielectric resin film is preferably 100° or less.

In the first aspect, the contact angle of water with respect to the second metal layer (hereinafter also referred to as the contact angle of the second metal layer) is preferably 74° or less and more preferably 72° or less. When the contact angle of water with respect to the second metal layer is 74° or less, the press performance of the wound body becomes good. Meanwhile, the contact angle of water with respect to the second metal layer is preferably 60° or more.

The contact angle of water with respect to the second metal layer indicates a contact angle of water with respect to the surface of the second metal layer opposed to the second surface of the dielectric resin film. For example, in a case where the second metal layer is formed on another dielectric resin film, the contact angle of water with respect to the second metal layer can be adjusted by changing the surface state (such as the contact angle or the surface energy) of the other dielectric resin film.

In the first aspect, the contact angle of water with respect to the first surface of the dielectric resin film (hereinafter also referred to as the contact angle of the first surface) is preferably 104° or less and more preferably 99° or less. In this case, it is preferable that the silicone resin is also contained in the first surface of the dielectric resin film. When the contact angle of water with respect to the first surface is 104° or less, the adhesion between the first surface of the dielectric resin film and the first metal layer is excellent, and the first metal layer is unlikely to be peeled from the film. Meanwhile, the contact angle of water with respect to the first surface of the dielectric resin film is preferably 94° or more.

The contact angle of water with respect to the first surface of the dielectric resin film indicates a contact angle of water with respect to the first surface in the absence of the first metal layer or the contact angle of water with respect to the first surface before the formation of the first metal layer.

The contact angle of water with respect to the second surface of the dielectric resin film indicates a contact angle measured with a contact angle meter (e.g., DM-701, manufactured by Kyowa Interface Science, Inc) immediately after dropping droplets of distilled water in an environment of 25° C. and 50% RH. The same holds true for the contact angle of water with respect to the second metal layer as well as the contact angle of water with respect to the first surface of the dielectric resin film.

In the first aspect, the amount of Si present in the second surface of the dielectric film is preferably 1.8 atom % or more and more preferably 7.0 atom % or more. When the amount of Si present in the second surface is 1.8 atom % or more, the press performance of the wound body becomes good. Meanwhile, the amount of Si present in the second surface of the dielectric film is preferably 9.3 atom % or less.

The amount of Si present in the second surface of the dielectric film indicates an amount of Si element in the outermost surface (depth: 0 nm) of the film at the side of the second surface when surface analysis is performed by X-ray photoelectron spectroscopy (XPS).

In the first aspect, the amount of Si present in the second metal layer is preferably 1.2 atom % or more. When the amount of Si present in the second metal layer is 1.2 atom % or more, the press performance of the wound body becomes good. Meanwhile, the amount of Si present in the second metal layer is preferably 2.1 atom % or less.

The amount of Si present in the second metal layer indicates an amount of Si present in the second metal layer opposed to the second surface of the dielectric resin film and is a value obtained by a method similar to that for the amount of Si present in the second surface of the dielectric film.

(Second Aspect)

In the second aspect of the film capacitor of the present invention, the surface energy of the second surface of the dielectric resin film is 45 mN/m or less.

In the second aspect, the surface energy of the second surface of the dielectric resin film is 45 mN/m or less and is preferably 30 mN/m or less. When the surface energy of the second surface is 45 mN/m or less, the press performance of the wound body becomes good. Meanwhile, the surface energy of the second surface of the dielectric resin film is preferably 24 mN/m or more.

In the second aspect, the surface energy of the second metal layer is preferably 50 mN/m or more and more preferably 55 mN/m or more. When the surface energy of the second metal layer is 50 mN/m or more, the press performance of the wound body becomes good. Meanwhile, the surface energy of the second metal layer is preferably 80 mN/m or less.

In the second aspect, the surface energy of the first surface of the dielectric resin film is preferably 22 mN/m or more. When the surface energy of the first surface is 22 mN/m or more, the adhesion between the first surface of the dielectric resin film and the first metal layer is excellent, and the first metal layer is unlikely to be peeled from the film. Meanwhile, the surface energy of the first surface of the dielectric resin film is preferably 30 mN/m or less.

In the second aspect, the contact angle of water with respect to the second surface of the dielectric resin film is preferably 87° or more and more preferably 97° or more. When the contact angle of water with respect to the second surface is 87° or more, the press performance of the wound body becomes good. Meanwhile, the contact angle of water with respect to the second surface of the dielectric resin film is preferably 100° or less.

In the second aspect, the contact angle of water with respect to the second metal layer is preferably 74° or less and more preferably 72° or less. When the contact angle of water with respect to the second metal layer is 74° or less, the press performance of the wound body becomes good. Meanwhile, the contact angle of water with respect to the second metal layer is preferably 60° or more.

In the second aspect, the contact angle of water with respect to the first surface of the dielectric resin film is preferably 104° or less and more preferably 99° or less. When the contact angle of water with respect to the first surface is 104° or less, the adhesion between the first surface of the dielectric resin film and the first metal layer is excellent, and the first metal layer is unlikely to be peeled from the film. Meanwhile, the contact angle of water with respect to the first surface of the dielectric resin film is preferably 94° or more.

In the second aspect, it is preferable that a silicone resin is contained in at least the second surface of the dielectric resin film. The silicone resin contained in the dielectric resin film is the same as that in the first aspect.

In the second aspect, it is preferable that a reaction product of a silicone resin and a curable resin is contained in the second surface of the dielectric resin film.

In the second aspect, it is preferable that the amount of the silicone resin contained in the dielectric resin film decreases from the second surface toward the inside of the film in the thickness direction of the dielectric resin film.

In the second aspect, the silicone resin may be contained in at least the second surface of the dielectric resin film and is preferably contained also in the first surface. In this case, it is preferable that the reaction product of the silicone resin and the curable resin is contained in the first surface of the dielectric resin film.

In a case where the silicone resin is contained in the first surface of the dielectric resin film, it is preferable that the amount of the silicone resin contained in the dielectric resin film decreases from the first surface toward the inside of the film in the thickness direction of the dielectric resin film.

In the second aspect, the amount of the silicone resin contained in the dielectric resin film is preferably 0.3 wt % or more and more preferably 0.5 wt % or more with respect to the amount of the curable resin. When the amount of the silicone resin is 0.3 wt % or more, the press performance of the wound body becomes good.

In the second aspect, the amount of the silicone resin contained in the dielectric resin film is preferably 15 wt % or less and more preferably 10 wt % or less with respect to the amount of the curable resin. In this case, it is preferable that the silicone resin is contained also in the first surface of the dielectric resin film. When the amount of the silicone resin is 15 wt % or less, the adhesion between the first surface of the dielectric resin film and the first metal layer is excellent, and the first metal layer is unlikely to be peeled from the film.

In the second aspect, the amount of Si present in the second surface of the dielectric film is preferably 1.8 atom % or more and more preferably 7.0 atom % or more. When the amount of Si present in the second surface is 1.8 atom % or more, the press performance of the wound body becomes good. Meanwhile, the amount of Si present in the second surface of the dielectric film is preferably 9.3 atom % or less.

In the second aspect, the amount of Si present in the second metal layer is preferably 1.2 atom % or more. When the amount of Si present in the second metal layer is 1.2 atom % or more, the press performance of the wound body becomes good. Meanwhile, the amount of Si present in the second metal layer is preferably 2.1 atom % or less.

(Third Aspect)

In the third aspect of the film capacitor of the present invention, the contact angle of water with respect to the second surface of the dielectric resin film is 87° or more.

In the third aspect, the contact angle of water with respect to the second surface of the dielectric resin film is 87° or more and is preferably 97° or more. When the contact angle of water with respect to the second surface is 87° or more, the press performance of the wound body becomes good. Meanwhile, the contact angle of water with respect to the second surface of the dielectric resin film is preferably 100° or less.

In the third aspect, the contact angle of water with respect to the second metal layer is preferably 74° or less and more preferably 72° or less. When the contact angle of water with respect to the second metal layer is 74° or less, the press performance of the wound body becomes good. Meanwhile, the contact angle of water with respect to the second metal layer is preferably 60° or more.

In the third aspect, the contact angle of water with respect to the first surface of the dielectric resin film is preferably 104° or less and more preferably 99° or less. When the contact angle of water with respect to the first surface is 104° or less, the adhesion between the first surface of the dielectric resin film and the first metal layer is excellent, and the first metal layer is unlikely to be peeled from the film. Meanwhile, the contact angle of water with respect to the first surface of the dielectric resin film is preferably 94° or more.

In the third aspect, the surface energy of the second surface of the dielectric resin film is preferably 45 mN/m or less and more preferably 30 mN/m or less. When the surface energy of the second surface is 45 mN/m or less, the press performance of the wound body becomes good. Meanwhile, the surface energy of the second surface of the dielectric resin film is preferably 24 mN/m or more.

In the third aspect, the surface energy of the second metal layer is preferably 50 mN/m or more and more preferably 55 mN/m or more. When the surface energy of the second metal layer is 50 mN/m or more, the press performance of the wound body becomes good. Meanwhile, the surface energy of the second metal layer is preferably 80 mN/m or less.

In the third aspect, the surface energy of the first surface of the dielectric resin film is preferably 22 mN/m or more. When the surface energy of the first surface is 22 mN/m or more, the adhesion between the first surface of the dielectric resin film and the first metal layer is excellent, and the first metal layer is unlikely to be peeled from the film. Meanwhile, the surface energy of the first surface of the dielectric resin film is preferably 30 mN/m or less.

In the third aspect, it is preferable that a silicone resin is contained in at least the second surface of the dielectric resin film. The silicone resin contained in the dielectric resin film is the same as that in the first aspect.

In the third aspect, it is preferable that a reaction product of a silicone resin and a curable resin is contained in the second surface of the dielectric resin film.

In the third aspect, it is preferable that the amount of the silicone resin contained in the dielectric resin film decreases from the second surface toward the inside of the film in the thickness direction of the dielectric resin film.

In the third aspect, the silicone resin may be contained in at least the second surface of the dielectric resin film and is preferably contained also in the first surface. In this case, it is preferable that the reaction product of the silicone resin and the curable resin is contained in the first surface of the dielectric resin film.

In a case where the silicone resin is contained in the first surface of the dielectric resin film, it is preferable that the amount of the silicone resin contained in the dielectric resin film decreases from the first surface toward the inside of the film in the thickness direction of the dielectric resin film.

In the third aspect, the amount of the silicone resin contained in the dielectric resin film is preferably 0.3 wt % or more and more preferably 0.5 wt % or more with respect to the amount of the curable resin. When the amount of the silicone resin is 0.3 wt % or more, the press performance of the wound body becomes good.

In the third aspect, the amount of the silicone resin contained in the dielectric resin film is preferably 15 wt % or less and more preferably 10 wt % or less with respect to the amount of the curable resin. In this case, it is preferable that the silicone resin is also contained in the first surface of the dielectric resin film. When the amount of the silicone resin is 15 wt % or less, the adhesion between the first surface of the dielectric resin film and the first metal layer is excellent, and the first metal layer is unlikely to be peeled from the film.

In the third aspect, the amount of Si present in the second surface of the dielectric film is preferably 1.8 atom % or more and more preferably 7.0 atom % or more. When the amount of Si present in the second surface is 1.8 atom % or more, the press performance of the wound body becomes good. Meanwhile, the amount of Si present in the second surface of the dielectric film is preferably 9.3 atom % or less.

In the third aspect, the amount of Si present in the second metal layer is preferably 1.2 atom % or more. When the amount of Si present in the second metal layer is 1.2 atom % or more, the press performance of the wound body becomes good. Meanwhile, the amount of Si present in the second metal layer is preferably 2.1 atom % or less.

In the present description, in a case where the first, second, and third aspects of the film capacitor of the present invention are not distinguished from each other, the film capacitor is simply referred to as "the film capacitor of the present invention".

In the film capacitor of the present invention, the dielectric resin film may contain an additive for adding other functionality. For example, smoothness can be imparted by adding a leveling agent. It is preferable that the additive is a material which has a functional group reactive with a hydroxyl group and/or an isocyanate group and forms a part of the cross-linked structure of the cured product. Examples of the material include resins having at least one functional group selected from the group consisting of an epoxy group, a silanol group, and a carboxyl group.

[Method of Producing Film Capacitor]

The method of producing a film capacitor of the present invention includes the steps of: producing a dielectric resin film having a first surface and a second surface opposite to the first surface and containing a curable resin; forming a first metal layer on the first surface of the dielectric resin film; and opposing the second metal layer to the second surface of the dielectric resin film. It is preferable that the second metal layer is not formed on the dielectric resin film on which the first metal layer is formed, but is formed on another dielectric resin film. Further, it is preferable that the second metal layer is opposed to the second surface of the dielectric resin film so as to be partially in contact with the second surface of the dielectric resin film. The other dielectric resin film may have a configuration which is different from that of the dielectric resin film having the first metal layer and preferably has the same configuration as that of the dielectric resin film having the first metal layer.

In the method of producing a film capacitor of the present invention, the dielectric resin film is produced using a resin solution containing a curable resin or a precursor of the curable resin and a silicone resin. In this regard, the method of producing a dielectric resin film is also one of the present inventions.

Since the silicone resin has characteristics of being likely to be deposited on the film surface, the silicone resin is contained in at least the second surface of the produced dielectric resin film. Therefore, it is possible to produce a film capacitor excellent in terms of low friction between a second surface of a resin film and a metal layer opposed to the surface of the resin film. Further, the amount of the silicone resin present in the film is small, so that it is possible to maintain the electrical characteristics of a capacitor. It is preferable that the silicone resin is contained also in the first surface of the dielectric resin film.

Figure 3:
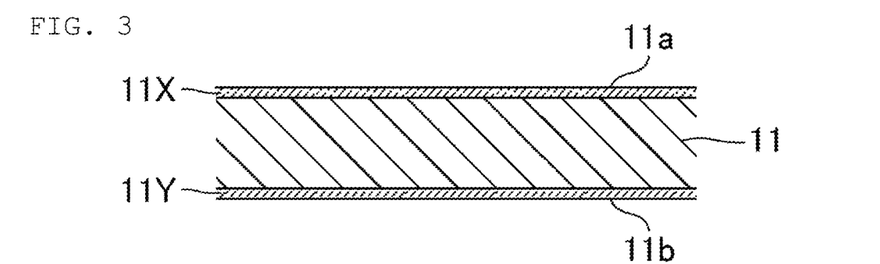
FIG. 3 is a sectional view schematically illustrating an example of a produced dielectric resin film.

FIG. 3 is a sectional view schematically illustrating an example of a produced dielectric resin film.

The first dielectric resin film 11 illustrated in FIG. 3 has the first surface 11a and the second surface 11b opposite to the first surface 11a, the silicone resin-containing layer 11Y is provided at the side of the second surface 11b of the first dielectric resin film 11, and the silicone resin-containing layer 11X is also provided at the side of the first surface 11a.

Similarly to FIG. 2, boundary lines between the silicone resin-containing layer 11X and the first dielectric resin film 11 and between the silicone resin-containing layer 11Y and the first dielectric resin film 11 do not necessarily appear clearly.

In the method of producing a film capacitor of the present invention, the resin solution preferably contains a precursor of a thermosetting resin as a precursor of a curable resin. The precursor of the thermosetting resin preferably includes a first organic material and a second organic material. Examples of the first organic material and the second organic material include a material in which a cured product is obtained by reacting a hydroxyl group (OH group) included in the first organic material with an isocyanate group (NCO group) included in the second organic material. Specifically, it is preferable that the first organic material is a phenoxy resin and the second organic material is an isocyanate compound.

The first organic material such as the phenoxy resin and the second organic material such as the isocyanate compound are as described in [Film Capacitor]. Further, as described in [Film Capacitor], it is not necessary that all the hydroxyl groups of the first organic material and the isocyanate groups of the second organic material react with one another, and some of the hydroxyl groups and some of the isocyanate groups may remain in the film.

In the method of producing a film capacitor of the present invention, examples of the silicone resin contained in the resin solution include polyester-modified polydimethylsiloxane and polyether-modified polydimethylsiloxane. These silicone resins do not necessarily have functional groups such as a hydroxyl group (OH group), an isocyanate group (NCO group), an epoxy group, a carboxy group (COOH group), and an amino group ($NH_2$ group), and it is preferable that the silicone resins have such functional groups. Two or more kinds of silicone resins may be used in combination.

When the silicone resin has a functional group such as a hydroxyl group, the functional group reacts with the isocyanate group or the like of the curable resin to form a cross-linked structure, thereby improving the low friction between the resin film and the metal layer. Thus, it is preferable to provide the reaction product of the silicone resin and the curable resin on the second surface of the dielectric resin film. It is also preferable to provide the reaction product of the silicone resin and the curable resin on the first surface of the dielectric resin film.

In the method of producing a film capacitor of the present invention, the amount of the silicone resin contained in the resin solution is preferably 0.3 wt % or more and more preferably 0.5 wt % or more with respect to the amount of the curable resin or a precursor of the curable resin. When the amount of the silicone resin is 0.3 wt % or more, the press performance of the wound body becomes good.

In the method of producing a film capacitor of the present invention, the amount of the silicone resin contained in the resin solution is preferably 15 wt % or less and more preferably 10 wt % or less with respect to the amount of the curable resin or a precursor of the curable resin. When the amount of the silicone resin is 15 wt % or less, the adhesion between the first surface of the dielectric resin film and the first metal layer is excellent, and the first metal layer is unlikely to be peeled from the film.

In the method of producing a film capacitor of the present invention, it is preferable that the dielectric resin film is formed by molding into a film a resin solution containing a curable resin or a precursor of the curable resin, a silicone resin, and, if necessary, an additive and curing the film by heat treatment. For example, the dielectric resin film can be produced by molding a resin solution into a film on the base film made of the thermoplastic resin as described above. In this case, the surface of the dielectric resin film located on the side opposite to the base film becomes a first surface, and the surface of the dielectric resin film located on the side of the base film becomes a second surface.

Figure 4:
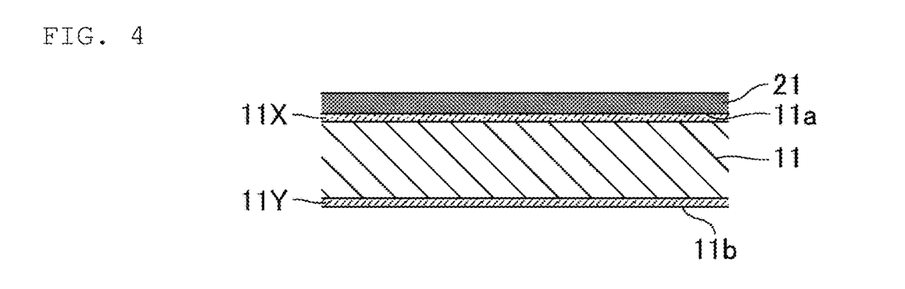
FIG. 4 is a sectional view schematically illustrating an example of a step of forming a first metal layer on a first surface of a dielectric resin film.

FIG. 4 is a sectional view schematically illustrating an example of a step of forming a first metal layer on a first surface of the dielectric resin film.

As illustrated in FIG. 4, the first metal layer 21 is formed on the first surface 11a of the first dielectric resin film 11. Although not illustrated in FIG. 4, it is preferable to form the second metal layer on the other dielectric resin film (the second dielectric resin film 12).

In the method of producing a film capacitor of the present invention, the first metal layer and the second metal layer are formed on the dielectric resin film by vapor deposition of a metal such as aluminum. In the method of producing a film capacitor of the present invention, it is preferable that the second metal layer is an aluminum layer, and it is more preferable that both the first metal layer and the second metal layer are aluminum layers.

In the case of producing a dielectric resin film, it is possible to form a metal layer on the dielectric resin film after the dielectric resin film is peeled from the base film. Further, in the case of producing a dielectric resin film on a base film, it is preferable to peel the dielectric resin film from the base film after a metal layer is formed on the dielectric resin film on the base film.

In the method of producing a film capacitor of the present invention, the method of opposing the second metal layer to the second surface of the dielectric resin film is not particularly limited. In the case of producing a wound-type film capacitor, it is preferable that the dielectric resin film having the first metal layer and the other dielectric resin film having the second metal layer are wound with each other.

Figure 5:
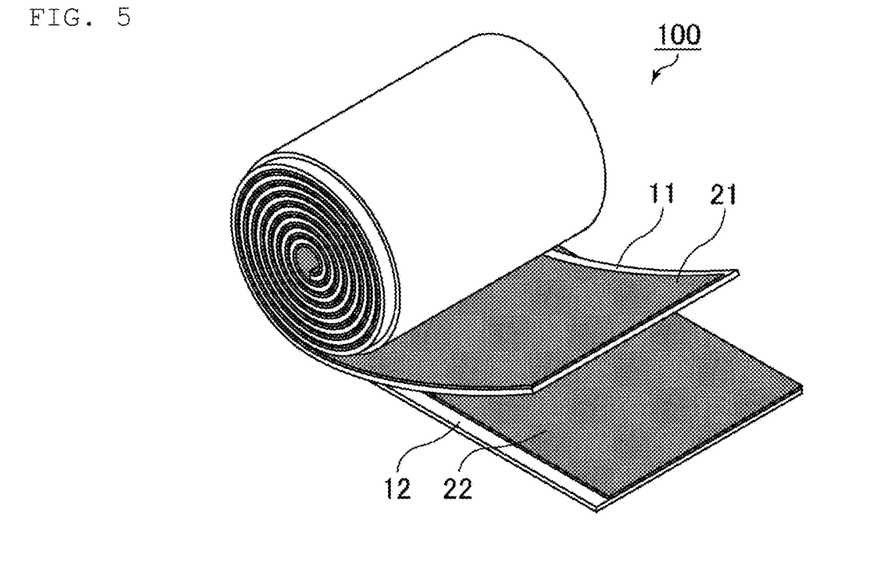
FIG. 5 is a perspective view schematically illustrating an example of a step of opposing a second metal layer to a second surface of the dielectric resin film.

FIG. 5 is a perspective view schematically illustrating an example of a step of opposing a second metal layer to a second surface of the dielectric resin film.

As illustrated in FIG. 5, two sheets of the first dielectric resin film 11 having the first metal layer 21 and the second dielectric resin film 12 having the second metal layer 22 are layered and wound in a roll shape by using a winding machine to form a wound body 100.

Figure 6:
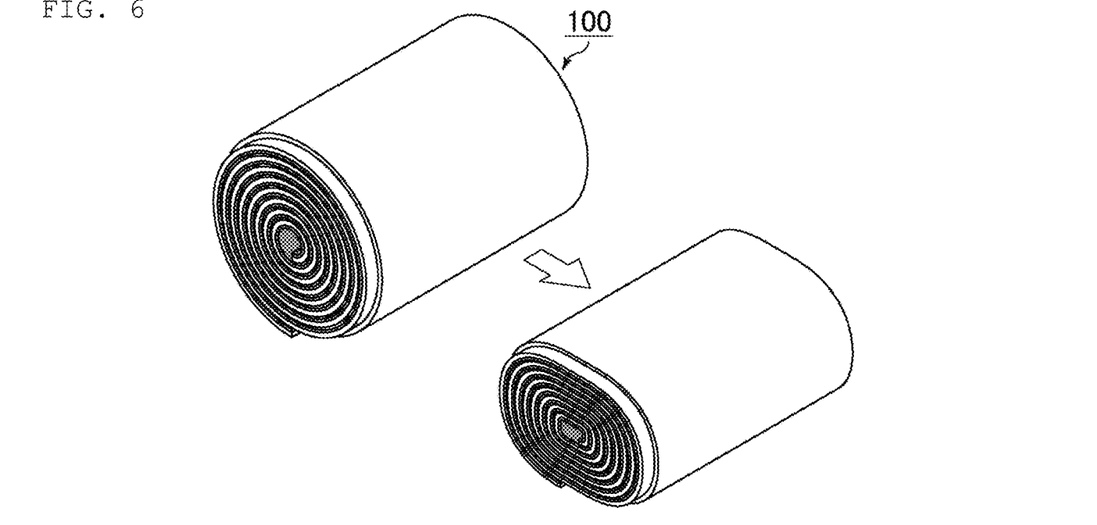
FIG. 6 is a perspective view schematically illustrating an example of a step of pressing a wound body.

FIG. 6 is a perspective view schematically illustrating an example of a step of pressing a wound body.

As illustrated in FIG. 6, in the case of producing a wound-type film capacitor, it is preferable that the method of producing a film capacitor of the present invention further includes a step of pressing a wound body of a dielectric resin film and another dielectric resin film. The wound body is pressed into a flat shape to have the cross section in an elliptical shape or an oval shape, thereby the wound body being made into a more compact shape.

Thereafter, zinc or the like is sprayed onto each end surface of the wound body to form the first external terminal electrode and the second external terminal electrode. The film capacitor is obtained in the above manner.

In the case of producing the laminated film capacitor, as the method of opposing the second metal layer to the second surface of the dielectric resin film, the dielectric resin film having the first metal layer and the other dielectric resin film having the second metal layer may be layered.

EXAMPLES

Hereinafter, examples in which the film capacitor of the present invention is more specifically disclosed will be described.

It should be noted that the present invention is not limited to these examples.

Example 1

[Production of Film Capacitor]

A phenoxy resin was prepared as a first organic material, and MDI (diphenylmethane diisocyanate) was prepared as a second organic material. A phenoxy resin, i.e., a high-molecular-weight bisphenol A-type epoxy resin having an epoxy group at a terminal, was used as the phenoxy resin. A mixture of 4,4'-diphenylmethane diisocyanate and a carbo-diimide-modified product thereof (weight ratio 70:30) was used as the MDI.

A polyester-modified polydimethylsiloxane solution having a hydroxyl group (BYK370, manufactured by BYK Additives & Instruments, non-volatile content: 25%) was prepared as a silicone resin.

The first organic material, the second organic material, and the silicone resin were mixed at a predetermined weight ratio to obtain a resin solution. In order to obtain the resin solution, the phenoxy resin was dissolved in a mixed solvent of methyl ethyl ketone and toluene, a solution of MDI was added to the phenoxy resin solution, and further a silicone resin dissolved in a solvent was added. In the film to be produced, each of the materials was blended so that the weight ratio of phenoxy resin to MDI to silicone resin was 70 wt %:30 wt %:0.5 wt %.

The obtained resin solution was molded on a base film using a doctor blade coater, thereby obtaining an uncured film having a thickness of 3 μm. Then, the uncured film was thermally cured by heat treatment in a hot-air oven set at 90° C. for 1 hour, whereby a first dielectric resin film for forming a first metal layer and a second dielectric resin film for forming a second metal layer were obtained. A PP film (manufactured by Shin-Etsu Film Co., Ltd.) having a thickness of 30 μm was used as the base film.

Aluminum was vapor-deposited on each of the first dielectric resin film and the second dielectric resin film, whereby the first metal layer was formed on the first dielectric resin film and the second metal layer was formed on the second dielectric resin film. The vapor-deposited films on which the corresponding metal layers were formed were peeled off from the PP film. Thereafter, the two vapor-deposited films were wound to form a wound body. The first metal layer was formed on the first surface of the first dielectric resin film, and the second metal layer on the second dielectric resin film was opposed to the second surface of the first dielectric resin film. The wound body was pressed into a flat shape, external terminal electrodes were formed on both end surfaces of the wound body, and thus a film capacitor was produced.

[Analysis of Dielectric Resin Film]

With respect to the film capacitor of Example 1, the FT-IR spectrum of the dielectric resin film was obtained and showed that a urethane group was contained.

Gas chromatography mass spectrometry (GC-MS) analysis of the dielectric resin film was carried out, and it was confirmed that the phenoxy component and the isocyanate component were contained in the decomposed gas.

The dielectric resin film was immersed in an ethanol solvent, and FT-IR spectrum was then obtained and showed that the silicone resin was not eluted.

In order to confirm the presence of the Si element, the second surface of the dielectric resin film was defined as the outermost surface, and the film portion having no electrode was subjected to XPS surface analysis in the depth direction of the film. The results are shown in FIG. 7.

Figure 7:
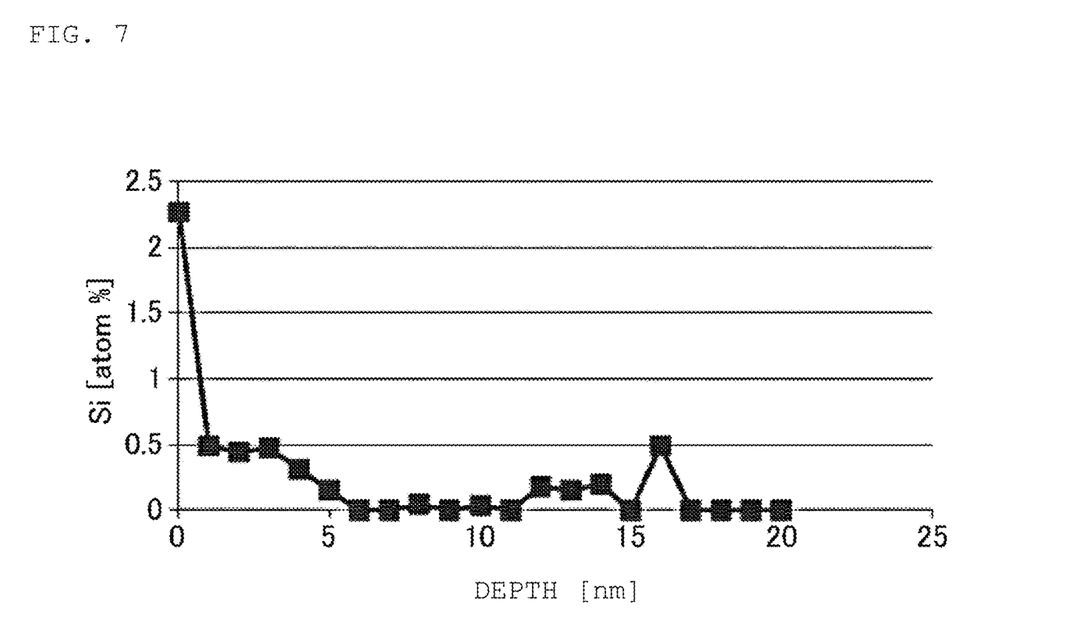
FIG. 7 is a graph illustrating the results of surface analysis of the dielectric resin film configured to form a film capacitor of Example 1.

From FIG. 7, it was confirmed that the Si element was deposited on the surface of the film. This result shows that the amount of the silicone resin contained in the dielectric resin film decreases from the second surface toward the inside of the film in the thickness direction of the film.

Example 2

A dielectric resin film was produced in the same manner as in Example 1 except that the polyester-modified polydimethylsiloxane solution having no hydroxyl group (BYK302, manufactured by BYK Additives & Instruments, non-volatile content: 95%) was used as the silicone resin, and thus a film capacitor was produced.

Comparative Example 1

A dielectric resin film was produced in the same manner as in Example 1 except that no silicone resin was used, and thus a film capacitor was produced.

[Evaluation of Press Performance]

With respect to the film capacitors of Examples 1 and 2 and Comparative Example 1, the press performance when the wound body was pressed at a pressure of 25 N/cm² was evaluated. The case where the wound body was sufficiently flattened was evaluated as "Excellent ⊙", the case where the wound body was flattened was evaluated as "Good ○", the case where the wound body was flattened but had an irregular shape was evaluated as "Fair Δ", and the case where the wound body was not flattened was evaluated as "Poor x". The results are shown in Table 1.

TABLE 1

| | Dielectric resin film | Press performance |
|---|---|---|
| Example 1 | Thermosetting resin + silicone resin having a hydroxyl group | ⊙ |
| Example 2 | Thermosetting resin + silicone resin having no hydroxyl group | ○ |
| Comparative Example 1 | Only thermosetting resin | X |

From Table 1, it was confirmed that, in Examples 1 and 2 in which the silicone resin was added to the thermosetting resin, the press performance was improved as compared with that in Comparative Example 1 in which the silicone resin was not added. Particularly, it was confirmed that the press performance was further improved in the case of Example 1 using a silicone resin having a hydroxyl group. This is probably because the hydroxyl group of the silicone resin reacted with the isocyanate group of the thermosetting resin.

Examples 3 to 11

Dielectric resin films were produced in the same manner as in Example 1 except that the additive amounts of the silicone resin were changed to the values shown in Table 2, and thus film capacitors were produced. The press performance of each of the film capacitors of Examples 3 to 11 was also evaluated in the same manner as described above. The results are shown in Table 2.

With respect to the film capacitors of Examples 1 and 3 to 11 and Comparative Example 1, the electrode peeling was evaluated by examining the adhesion between the first surface of the dielectric resin film and the first metal layer. The evaluation of electrode peeling was performed on the dielectric resin film before producing the film capacitor.

In the electrode peeling evaluation test, the adhesion of the vapor-deposited film was examined by adhering an adhesive test tape to the vapor-deposited surface and rapidly and forcefully peeling the tape. An adhesive tape having a width of 12 to 19 mm (adhesive force: about 8 N per 25 mm width), prescribed in JIS Z 1522, was used as the test tape.

The method for the evaluation test of electrode peeling is described below.

(1) A vapor-deposited surface that is as flat as possible is selected.

(2) A tape is adhered so that the tape-attached portion includes the vapor-deposited surface and a non-vapor-deposited surface. At this time, the tape is firmly pressed with fingers for about 10 seconds while care is taken not to generate bubbles.

(3) The portion of the tape remaining in (2) above is held, the tape is pulled strongly perpendicularly to the vapor-deposited surface, and the tape is peeled instantaneously.

The test was performed 10 times at different locations of the tape, and the case where the number of peeled vapor-deposited films was 0 was evaluated as "Excellent ⊙", the case where the number of peeled vapor-deposited films was 1 or 2 was evaluated as "Good ○", and the case where the number of peeled vapor-deposited films was 3 or more was evaluated as "Poor x". The results are shown in Table 2.

Further, with respect to the film capacitors of Examples 1, 3, 4, and 8 to 11 and Comparative Example 1, the surface energy of the second metal layer, the surface energy of the first surface of the dielectric resin film, and the surface energy of the second surface were determined, respectively.

With respect to the second metal layer and the first surface and the second surface of the dielectric resin film, the contact angle was measured using three liquids of water, ethylene glycol, and diiodomethane, and the surface energy was calculated in accordance with the Kitazaki-Hata theory. The dielectric resin film before producing the film capacitor and before forming the first metal layer was used to measure the contact angle with respect to the first surface. The contact angle of water was measured by the method to be described later, and the contact angle of each of the other two liquids was measured by a similar method. The results are shown in Table 3.

TABLE 2

| | Additive amount of the silicone resin [wt %] | Press performance | Electrode peeling |
|---|---|---|---|
| Comparative Example 1 | 0 | X | ⊙ |
| Example 3 | 0.1 | Δ | ⊙ |
| Example 4 | 0.3 | ○ | ⊙ |
| Example 1 | 0.5 | ⊙ | ⊙ |
| Example 5 | 1 | ⊙ | ⊙ |
| Example 6 | 2 | ⊙ | ⊙ |
| Example 7 | 3 | ⊙ | ⊙ |
| Example 8 | 5 | ⊙ | ⊙ |
| Example 9 | 10 | ⊙ | ⊙ |
| Example 10 | 15 | ⊙ | ○ |
| Example 11 | 20 | ⊙ | X |

TABLE 3

| | Additive amount of the silicone resin [wt %] | Press performance | Electrode peeling | Surface energy of the second metal layer | Surface energy of the film | |
|---|---|---|---|---|---|---|
| | | | | | First surface (vapor-deposited surface) | Second surface (non-vapor-deposited surface) |
| Comparative Example 1 | 0 | X | ◎ | 40 | 43 | 50 |
| Example 3 | 0.1 | Δ | ◎ | 41 | 33 | 47 |
| Example 4 | 0.3 | ○ | ◎ | 50 | 28 | 45 |
| Example 1 | 0.5 | ◎ | ◎ | 55 | 24 | 30 |
| Example 8 | 5 | ◎ | ◎ | 58 | 22 | 25 |
| Example 9 | 10 | ◎ | ◎ | 80 | 22 | 26 |
| Example 10 | 15 | ◎ | ○ | 59 | 22 | 24 |
| Example 11 | 20 | ◎ | X | 95 | 18 | 18 |

From Table 2, it was confirmed that the press performance was improved by increasing the additive amount of the silicone resin to 0.1 wt % or more. Although flattening is achieved even when the additive amount of the silicone resin is 0.1 wt %, the additive amount of the silicone resin is preferably 0.3 wt % or more and more preferably 0.5 wt % or more from the viewpoint of obtaining good press performance. As shown in Table 3, this is due to the fact that the silicone resin was deposited on the surface of the film, whereby the surface energy of the film was reduced. The surface energy is an index showing the intermolecular force and the polar force between the film surfaces. Accordingly, it can be said that the attraction force interacting with the film surfaces was decreased and the sliding of the wound film was increased, so that the press performance was improved.

Taking the results of Tables 2 and 3 into consideration, it is considered that the surface energy of the second surface of the dielectric resin film is preferably 45 mN/m or less and more preferably 30 mN/m or less from the viewpoint of obtaining good press performance. Similarly, it is considered that the surface energy of the second metal layer is preferably 50 mN/m or more and more preferably 55 mN/m or more from the viewpoint of obtaining good press performance.

Further, from Table 2, it was confirmed that when the additive amount of the silicone resin was set to 15 wt % or less, the adhesion between the first surface of the dielectric resin film and the first metal layer was improved, and thus the first metal layer was unlikely to have been peeled from the film. From the viewpoint of obtaining good adhesion, the additive amount of the silicone resin is preferably 10 wt % or less.

The adhesion between the first surface of the dielectric resin film and the first metal layer relates to the surface energy of the first surface. Taking the results of Tables 2 and 3 into consideration, it is considered that the surface energy of the first surface of the dielectric resin film is preferably 22 mN/m or more from the viewpoint of obtaining good adhesion.

Separately, with respect to the film capacitors of Examples 1, 3, 4, and 8 to 11 and Comparative Example 1, the contact angle of water with respect to the second metal layer, the contact angle of water with respect to the first surface of the dielectric resin film, and the contact angle of water with respect to the second surface of the dielectric resin film were measured, respectively.

Water droplets were dropped on the second metal layer, the first surface, and the second surface in an environment of 25° C. and 50% RH(° C.), and each contact angle immediately after dropping the water droplets was measured using a contact angle meter (DM-701, manufactured by Kyowa Interface Science, Inc). The results are shown in Table 4.

TABLE 4

| | Additive amount of the silicone resin [wt %] | Press performance | Electrode peeling | Contact angle of the second metal layer [°] | Contact angle of the film [°] | |
|---|---|---|---|---|---|---|
| | | | | | First surface (vapor-deposited surface) | Second surface (non-vapor-deposited surface) |
| Comparative Example 1 | 0 | X | ◎ | 81 | 91 | 77 |
| Example 3 | 0.1 | Δ | ◎ | 80 | 93 | 79 |
| Example 4 | 0.3 | ○ | ◎ | 74 | 94 | 87 |
| Example 1 | 0.5 | ◎ | ◎ | 72 | 99 | 97 |
| Example 8 | 5 | ◎ | ◎ | 70 | 99 | 99 |
| Example 9 | 10 | ◎ | ◎ | 63 | 99 | 98 |
| Example 10 | 15 | ◎ | ○ | 68 | 104 | 97 |
| Example 11 | 20 | ◎ | X | 50 | 109 | 105 |

From Table 4, it is considered that the contact angle of water with respect to the second surface of the dielectric resin film is preferably 87° or more and more preferably 97° or more from the viewpoint of obtaining good press performance. Similarly, it is considered that the contact angle of water with respect to the second metal layer is preferably 74° or less and more preferably 72° or less from the viewpoint of obtaining good press performance. From the viewpoint of obtaining good adhesion between the first surface of the dielectric resin film and the first metal layer, it is considered that the contact angle of water with respect to the first surface of the dielectric resin film is preferably 104° or less and more preferably 99° or less.

Further, the film capacitors of Examples 1, 3, 4, and 8 to 11 and Comparative Example 1 were subjected to surface analysis by X-ray photoelectron spectroscopy (XPS), and the amount of Si present in the second metal layer and the amount of Si present in the second surface of the dielectric film were measured, respectively. The results are shown in Table 5. In Table 5, the amount of Si present in the second metal layer is referred to as "Amount of Si in the second metal layer", and the amount of Si present in the second surface of the dielectric film is referred to as "Amount of Si in the second surface of the film".

TABLE 5

|  | Additive amount of the silicone resin [wt %] | Press performance | Electrode peeling | Amount of Si in the second metal layer [atom %] | Amount of Si in the second surface of the film [atom %] |
|---|---|---|---|---|---|
| Comparative Example 1 | 0 | X | ⊚ | 0.0 | 0.0 |
| Example 3 | 0.1 | Δ | ⊚ | 0.3 | 1.0 |
| Example 4 | 0.3 | ○ | ⊚ | 1.4 | 1.8 |
| Example 1 | 0.5 | ⊚ | ⊚ | 1.3 | 7.0 |
| Example 8 | 5 | ⊚ | ⊚ | 1.2 | 8.0 |
| Example 9 | 10 | ⊚ | ⊚ | 2.1 | 9.3 |
| Example 10 | 15 | ⊚ | ○ | 1.3 | 9.3 |
| Example 11 | 20 | ⊚ | X | 2.5 | 12.0 |

From Table 5, it is considered that the amount of Si present in the second surface of the dielectric resin film is preferably 1.8 atom % or more and more preferably 7.0 atom % or more from the viewpoint of obtaining good press performance. Similarly, it is considered that the amount of Si present in the second metal layer is 1.2 atom % or more from the viewpoint of obtaining good press performance.

Since the silicone resin is segregated in the surface of the film due to a difference in chemical properties between the resin constituting the film and the silicone resin, the amount of Si present in the surface of the film is different from the amount of the silicone resin actually added to produce the film. In the film production process, the amount of Si present in the surface of the film varies due to the influences of: (1) the drying temperature in the process of forming a film and drying a solvent; (2) the temperature for heat-treating the film; and (3) the vapor-deposited thickness in the vapor-deposition process. In the examples, the drying temperature for forming the film is appropriately selected in the range of 40° C. to 180° C., the temperature for heat-treating the film is appropriately selected in the range of 40° C. to 180° C., and the vapor-deposited thickness in the vapor-deposition process is appropriately selected in the range of 5 nm to 50 nm.

Examples 12 and 13

Dielectric resin films were produced in the same manner as in Example 1 except that the polyester-modified polydimethylsiloxane solution having no hydroxyl group (BYK302, manufactured by BYK Additives & Instruments, non-volatile content: 95%) was used as the silicone resin and the additive amounts of the silicone resin were changed to the values shown in Table 6, and thus film capacitors were produced.

The insulation resistance of each of the film capacitors of Example 8, 9, 12, and 13 was measured. Table 6 shows insulation resistance values when elements having capacitance of 20 μF were formed as capacitors. In the measurement of the insulation resistance, a high-resistance meter (R8340, manufactured by Advantest Corporation) was used, the temperature was 125° C., the voltage was 250 V, and the charging time and the discharging time were 30 s and 30 s, respectively.

TABLE 6

|  | Hydroxyl group of the silicone resin | Additive amount of the silicone resin [wt %] | Insulation resistance [Ω] | Determination |
|---|---|---|---|---|
| Example 8 | Presence | 5 | $5.1 \times 10^7$ | ⊚ |
| Example 9 | Presence | 10 | $4.2 \times 10^7$ | ⊚ |
| Example 12 | Absence | 5 | $5.1 \times 10^7$ | ⊚ |
| Example 13 | Absence | 10 | $3.2 \times 10^6$ | ○ |

From Table 6, it was confirmed that Examples 8 and 9 exhibited high insulation resistance. This is considered to be due to the fact that the hydroxyl group in the silicone resin can react with the thermosetting resin. Meanwhile, it was confirmed that Example 12 with a small additive amount of the silicone resin exhibited high insulation resistance when the silicone resin did not have a hydroxyl group, whereas Example 13 exhibited a decrease in insulation resistance when the additive amount of the silicone resin was large. This is considered to be due to an increase in components that are not incorporated in the cross-linked structure.

Examples 14 to 16

In Examples 14 to 16, dielectric resin films were produced using the following silicone resins to form film capacitors.

In Examples 14 to 16, silicone resins capable of reacting with an epoxy group of a phenoxy resin or an isocyanate group (NCO group) of MDI were used.

In Example 14, an epoxy group-containing silicone resin having an epoxy group was used as the silicone resin.

In Example 15, an amino group-containing silicone resin having an amino group was used as the silicone resin.

In Example 16, a hydroxyl group-containing acryl-modified silicone resin having a hydroxyl group was used as the silicone resin.

In Examples 14 to 16, the phenoxy resin was used as the first organic material and the MDI was used as the second organic material. Further, each of the materials was blended so that the weight ratio of phenoxy resin to MDI to silicone resin was 70 wt %:30 wt %:5 wt %.

The press performance and electrode peeling in each of the film capacitors of Examples 14 to 16 were evaluated in the same manner as described above. Further, the surface energy of the second metal layer, the surface energy of the first surface of the dielectric resin film, and the surface energy of the second surface were determined, respectively. The results are shown in Table 7.

TABLE 7

|  | Silicone resin | Press performance | Electrode peeling | Surface energy of the second metal layer | Surface energy of the film | |
|---|---|---|---|---|---|---|
|  |  |  |  |  | First surface (vapor-deposited surface) | Second surface (non-vapor-deposited surface) |
| Example 14 | Epoxy group-containing silicone resin | ⊚ | ⊚ | 57 | 20 | 25 |
| Example 15 | Amino group-containing silicone resin | ⊚ | ⊚ | 56 | 21 | 19 |
| Example 16 | Hydroxyl group-containing acryl-modified silicone resin | ⊚ | ⊚ | 55 | 23 | 27 |

From Table 7, it was confirmed that, in Examples 14 to 16 using any of the silicone resins, the evaluation results of press performance and electrode peeling were good.

In the examples so far, when the phenoxy resin was used as the first organic material and the MDI was used as the second organic material, the weight ratio of the phenoxy resin to MDI was 70:30, but it was confirmed that the same effect could be obtained when the weight ratio was 60:40 or 50:50.

Examples 17 to 19

In Examples 17 to 19, dielectric resin films were produced using thermosetting resins other than a combination of the phenoxy resin and the MDI to form film capacitors.

In Example 17, polyvinyl acetoacetal (PVAA) was used as the first organic material, and tolylene diisocyanate (TDI) was used as the second organic material. As the TDI, trimethyl propanol-modified tolylene diisocyanate was used.

In Example 18, the phenoxy resin was used as the first organic material and the melamine resin was used as the second organic material. As the melamine resin, an alkylated melamine resin was used.

In Example 19, the phenoxy resin was used as the first organic material and the epoxy resin was used as the second organic material. As the epoxy resin, a novolac-type epoxy resin was used. In order to promote the curing reaction, a 0.1 wt % imidazole catalyst was added as a catalyst.

In Examples 17 to 19, the weight ratio of the first organic material to the second organic material was 50:50. Polyester-modified polydimethylsiloxane having a hydroxyl group was used as the silicone resin. Further, the materials were blended so that the weight ratio of the first organic material to the second organic material to the silicone resin was 50 wt %:50 wt %:5 wt %.

The press performance and electrode peeling in each of the film capacitors of Examples 17 to 19 were evaluated in the same manner as described above. Further, the surface energy of the second metal layer, the surface energy of the first surface of the dielectric resin film, and the surface energy of the second surface were determined, respectively. The results are shown in Table 8.

TABLE 8

| | First organic material | Second organic material | Press performance | Electrode peeling | Surface energy of the second metal layer | Surface energy of the film | |
| --- | --- | --- | --- | --- | --- | --- | --- |
| | | | | | | First surface (vapor-deposited surface) | Second surface (non-vapor-deposited surface) |
| Example 17 | PVAA | TDI | ⊚ | ⊚ | 57 | 22 | 25 |
| Example 18 | Phenoxy resin | Melamine resin | ⊚ | ⊚ | 59 | 21 | 26 |
| Example 19 | Phenoxy resin | Epoxy resin | ⊚ | ⊚ | 58 | 24 | 27 |

From Table 8, it was confirmed that, in Examples 17 to 19 using any of the thermosetting resins, the evaluation results of press performance and electrode peeling were good.

DESCRIPTION OF REFERENCE SYMBOLS

1: Film capacitor
11: First dielectric resin film
12: Second dielectric resin film
11a: First surface of first dielectric resin film
11b: Second surface of first dielectric resin film
11X, 11Y: Silicone resin-containing layer
21: First metal layer (first opposed electrode)
22: Second metal layer (second opposed electrode)
31: First external terminal electrode
32: Second external terminal electrode
100: Wound body

The invention claimed is:

1. A film capacitor comprising:
a dielectric resin film having a first surface and a second surface opposite to the first surface, the second surface having a silicone resin-containing layer;
a first metal layer opposed to the first surface of the dielectric resin film; and
a second metal layer opposed to the second surface of the dielectric resin film,
wherein the silicone resin-containing layer contains a reaction product of a silicone resin and a curable resin contained in the dielectric resin film.

2. The film capacitor according to claim 1, wherein an amount of the silicone resin contained in the dielectric resin film decreases from the second surface toward an inside of the dielectric resin film in a thickness direction of the dielectric resin film.

3. The film capacitor according to claim 1, wherein an amount of the silicone resin contained in the dielectric resin film is 0.3 wt % or more with respect to an amount of the curable resin.

4. The film capacitor according to claim 3, wherein the amount of the silicone resin contained in the dielectric resin film is 0.5 wt % or more with respect to the amount of the curable resin.

5. The film capacitor according to claim 1, wherein an amount of Si present in the second surface of the dielectric resin film is 1.8 atom % or more.

6. The film capacitor according to claim 5, wherein the amount of Si present in the second surface of the dielectric resin film is 7.0 atom % or more.

7. The film capacitor according to claim 1, wherein a surface energy of the second surface of the dielectric resin film is 45 mN/m or less.

8. The film capacitor according to claim 7, wherein the surface energy of the second surface of the dielectric resin film is 30 mN/m or less.

9. The film capacitor according to claim 7, wherein a surface energy of the second metal layer is 50 mN/m or more.

10. The film capacitor according to claim 9, wherein the surface energy of the second metal layer is 55 mN/m or more.

11. The film capacitor according to claim 1, wherein a surface energy of the first surface of the dielectric resin film is 22 mN/m or more.

12. The film capacitor according to claim 1, wherein a first contact angle of water with respect to the second surface of the dielectric resin film is 87° or more.

13. The film capacitor according to claim 12, wherein the first contact angle is 97° or more.

14. The film capacitor according to claim 12, wherein a second contact angle of water with respect to the second metal layer is 74° or less.

15. The film capacitor according to claim 14, wherein the second contact angle is 72° or less.

16. The film capacitor according to claim 1, wherein a contact angle of water with respect to the first surface of the dielectric resin film is 104° or less.

17. The film capacitor according to claim 16, wherein the contact angle is 99° or less.

18. The film capacitor according to claim 1, wherein the second metal layer is an aluminum layer.

19. The film capacitor according to claim 1, wherein
the curable resin is a thermosetting resin made of a cured product of a first organic material and a second organic material,
the first organic material is a phenoxy resin, the second organic material is an isocyanate compound, and
both the first metal layer and the second metal layer are aluminum layers.

20. The film capacitor according to claim 1, wherein
the curable resin is a thermosetting resin,
the dielectric resin film contains at least one of a hydroxyl group and an isocyanate group, and
both the first metal layer and the second metal layer are aluminum layers.

21. The film capacitor according to claim 20, wherein a content of the hydroxyl group in the dielectric resin film is larger than a content of the isocyanate group in the dielectric resin film.

22. The film capacitor according to claim 1, wherein the dielectric resin film is a first dielectric resin film having the first metal layer, the film capacitor further includes a second dielectric resin film having the second metal layer, and wherein the first dielectric film and the second dielectric film are wound to form the film capacitor.

23. A film capacitor comprising:
a dielectric resin film having a first surface and a second surface opposite to the first surface, wherein a surface energy of the second surface of the dielectric resin film is 45 mN/m or less;

a first metal layer opposed to the first surface of the dielectric resin film; and
a second metal layer opposed to the second surface of the dielectric resin film,
wherein the dielectric film includes a curable resin,
the curable resin is a thermosetting resin made of a cured product of a first organic material and a second organic material,
the first organic material is a phenoxy resin, the second organic material is an isocyanate compound, and
both the first metal layer and the second metal layer are aluminum layers.

24. The film capacitor according to claim 23, wherein the surface energy of the second surface of the dielectric resin film is 30 mN/m or less.

25. The film capacitor according to claim 23, wherein a surface energy of the second metal layer is 50 mN/m or more.

26. The film capacitor according to claim 25, wherein the surface energy of the second metal layer is 55 mN/m or more.

27. The film capacitor according to claim 23, wherein a surface energy of the first surface of the dielectric resin film is 22 mN/m or more.

28. The film capacitor according to claim 23, wherein the dielectric resin film is a first dielectric resin film having the first metal layer, the film capacitor further includes a second dielectric resin film having the second metal layer, and wherein the first dielectric film and the second dielectric film are wound to form the film capacitor.

29. A film capacitor comprising:
a dielectric resin film having a first surface and a second surface opposite to the first surface, wherein a surface energy of the second surface of the dielectric resin film is 45 mN/m or less:
a first metal layer opposed to the first surface of the dielectric resin film; and
a second metal layer opposed to the second surface of the dielectric resin film,
wherein the dielectric film includes a curable resin,
the curable resin is a thermosetting resin,
the dielectric resin film contains at least one of a hydroxyl group and an isocyanate group, and
both the first metal layer and the second metal layer are aluminum layers.

30. The film capacitor according to claim 29, wherein a content of the hydroxyl group in the dielectric resin film is larger than a content of the isocyanate group in the dielectric resin film.

31. A film capacitor comprising:
a dielectric resin film having a first surface and a second surface opposite to the first surface, wherein a contact angle of water with respect to the second surface of the dielectric resin film is 87° or more;
a first metal layer opposed to the first surface of the dielectric resin film; and
a second metal layer opposed to the second surface of the dielectric resin film,
wherein the dielectric film includes a curable resin,
the curable resin is a thermosetting resin made of a cured product of a first organic material and a second organic material,
the first organic material is a phenoxy resin, the second organic material is an isocyanate compound, and
both the first metal layer and the second metal layer are aluminum layers.

32. The film capacitor according to claim 31, wherein the contact angle of water with respect to the second surface of the dielectric resin film is 97° or more.

33. The film capacitor according to claim 31, wherein a contact angle of water with respect to the second metal layer is 74° or less.

34. The film capacitor according to claim 33, wherein the contact angle of water with respect to the second metal layer is 72° or less.

35. The film capacitor according to claim 31, wherein a contact angle of water with respect to the first surface of the dielectric resin film is 104° or less.

36. The film capacitor according to claim 35, wherein the contact angle of water with respect to the first surface of the dielectric resin film is 99° or less.

37. The film capacitor according to claim 31, wherein the dielectric resin film is a first dielectric resin film having the first metal layer, the film capacitor further includes a second dielectric resin film having the second metal layer, and wherein the first dielectric film and the second dielectric film are wound to form the film capacitor.

38. A film capacitor comprising:
a dielectric resin film having a first surface and a second surface opposite to the first surface, wherein a contact angle of water with respect to the second surface of the dielectric resin film is 87° or more;
a first metal layer opposed to the first surface of the dielectric resin film; and
a second metal layer opposed to the second surface of the dielectric resin film,
wherein the dielectric film includes a curable resin,
the curable resin is a thermosetting resin,
the dielectric resin film contains at least one of a hydroxyl group and an isocyanate group, and
both the first metal layer and the second metal layer are aluminum layers.

39. The film capacitor according to claim 38, wherein a content of the hydroxyl group in the dielectric resin film is larger than a content of the isocyanate group in the dielectric resin film.

40. A dielectric resin film having a first surface and a second surface opposite to the first surface, wherein the second surface has a silicone resin-containing layer, and the silicone resin-containing layer contains a reaction product of a silicone resin and a curable resin contained in the dielectric resin film.

41. The dielectric resin film according to claim 40, wherein an amount of the silicone resin contained in the dielectric resin film decreases from the second surface toward an inside of the dielectric resin film in a thickness direction of the dielectric resin film.

42. The dielectric resin film according to claim 40, wherein an amount of the silicone resin contained in the dielectric resin film is 0.3 wt % or more with respect to an amount of the curable resin.

43. The dielectric resin film according to claim 42, wherein the amount of the silicone resin contained in the dielectric resin film is 0.5 wt % or more with respect to the amount of the curable resin.

44. The dielectric resin film according to claim 40, wherein an amount of Si present in the second surface of the dielectric resin film is 1.8 atom % or more.

45. The dielectric resin film according to claim 44, wherein the amount of Si present in the second surface of the dielectric resin film is 7.0 atom % or more.

46. The dielectric resin film according to claim 40, wherein a surface energy of the second surface is 45 mN/m or less.

47. The dielectric resin film according to claim 46, wherein the surface energy of the second surface is 30 mN/m or less.

48. The dielectric resin film according to claim 40, wherein a surface energy of the first surface is 22 mN/m or more.

49. The dielectric resin film according to claim 40, wherein a contact angle of water with respect to the second surface is 87° or more.

50. The dielectric resin film according to claim 49, wherein the contact angle of water with respect to the second surface is 97° or more.

51. The dielectric resin film according to claim 40, wherein a contact angle of water with respect to the first surface is 104° or less.

52. The dielectric resin film according to claim 51, wherein the contact angle of water with respect to the first surface is 99° or less.

53. The dielectric resin film according to claim 40, wherein
the curable resin is a thermosetting resin made of a cured product of a first organic material and a second organic material,
the first organic material is a phenoxy resin, and the second organic material is an isocyanate compound.

54. The dielectric resin film according to claim 40, wherein
the curable resin is a thermosetting resin, and
the dielectric resin film contains at least one of a hydroxyl group and an isocyanate group.

55. The dielectric resin film according to claim 54, wherein a content of the hydroxyl group in the dielectric resin film is larger than a content of the isocyanate group in the dielectric resin film.

56. The dielectric resin film according to claim 40, further comprising a base film on the second surface.

57. The dielectric resin film according to claim 40, further comprising a metal layer on the first surface.

58. The dielectric resin film according to claim 57, wherein the metal layer is an aluminum layer.

* * * * *